United States Patent
Karnati et al.

(10) Patent No.: US 10,573,322 B2
(45) Date of Patent: Feb. 25, 2020

(54) ESTABLISHMENT OF AUDIO-BASED NETWORK SESSIONS WITH NON-REGISTERED RESOURCES

(71) Applicant: Google Inc., Mountain View, CA (US)

(72) Inventors: Sriram Bhargav Karnati, Sunnyvale, CA (US); Varun Soundararajan, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/544,426

(22) PCT Filed: Jun. 13, 2017

(86) PCT No.: PCT/US2017/037284
§ 371 (c)(1),
(2) Date: Jul. 18, 2017

(87) PCT Pub. No.: WO2018/231209
PCT Pub. Date: Dec. 20, 2018

(65) Prior Publication Data
US 2018/0358022 A1    Dec. 13, 2018

(51) Int. Cl.
*G10L 21/00*    (2013.01)
*G10L 25/00*    (2013.01)
(Continued)

(52) U.S. Cl.
CPC .............. *G10L 17/22* (2013.01); *G06F 3/167* (2013.01); *G06F 16/43* (2019.01);
(Continued)

(58) Field of Classification Search
CPC ....... G10L 15/22; G10L 15/26; G10L 15/183; G10L 15/265; G10L 15/1822; G06F 3/167; G06F 17/30
(Continued)

(56) References Cited

U.S. PATENT DOCUMENTS 8,346,563 B1 *    1/2013    Hjelm ................. G10L 15/1822
                                                                 379/88.01
9,645,983 B1 *    5/2017    Tuan ..................... G06F 16/957
(Continued)

FOREIGN PATENT DOCUMENTS

EP    2 851 896    3/2015

OTHER PUBLICATIONS

Abrams, Help users find, interact & re-engage with your app on the Google Assistant, Google Developers Blog, Nov. 15, 2017, 16 pages.
(Continued)

*Primary Examiner* — Olujimi A Adesanya
(74) *Attorney, Agent, or Firm* — Foley & Lardner LLP; James De Vellis

(57) ABSTRACT

The present disclosure is generally directed to increasing the scalability of onboarding network resources, such as a digital component, to a voice-based network. The system enables the navigating of and interaction with digital components using voice or speech input and output interfaces on a computing device. The system can receive and processes an input audio signal to identify a digital component. The system enables voice-based interaction with the previously unregistered digital component via the input and output interfaces.

19 Claims, 4 Drawing Sheets

(51) Int. Cl.

| | |
|---|---|
| *G10L 21/06* | (2013.01) |
| *G10L 17/22* | (2013.01) |
| *G10L 15/22* | (2006.01) |
| *G06F 3/16* | (2006.01) |
| *G06F 16/43* | (2019.01) |
| *G10L 15/18* | (2013.01) |
| *G10L 17/24* | (2013.01) |
| *G06F 21/32* | (2013.01) |
| *H04L 12/58* | (2006.01) |

(52) U.S. Cl.
CPC .......... *G10L 15/1815* (2013.01); *G10L 15/22* (2013.01); *G10L 17/24* (2013.01); *G06F 21/32* (2013.01); *H04L 51/046* (2013.01)

(58) Field of Classification Search
USPC .............................. 704/231, 235, 270, 270.1
See application file for complete search history.

(56) References Cited

U.S. PATENT DOCUMENTS

| | | | | |
|---|---|---|---|---|
| 10,078,626 | B1* | 9/2018 | Voskamp | G06F 17/2247 |
| 2004/0128136 | A1* | 7/2004 | Irani | H04M 3/4938 |
| | | | | 704/270.1 |
| 2008/0221902 | A1* | 9/2008 | Cerra | G10L 15/065 |
| | | | | 704/270.1 |
| 2009/0030691 | A1* | 1/2009 | Cerra | G10L 15/183 |
| | | | | 704/255 |
| 2014/0365885 | A1* | 12/2014 | Carson | G06F 3/167 |
| | | | | 715/708 |
| 2015/0113409 | A1* | 4/2015 | Badger | H04M 3/5191 |
| | | | | 715/728 |
| 2015/0370787 | A1* | 12/2015 | Akbacak | G06F 17/2836 |
| | | | | 704/2 |
| 2016/0259656 | A1* | 9/2016 | Sumner | G06F 3/167 |
| 2017/0091290 | A1* | 3/2017 | Lupien | G06F 16/2471 |
| 2017/0092278 | A1 | 3/2017 | Evermann et al. | |
| 2017/0110130 | A1 | 4/2017 | Sharifi et al. | |
| 2017/0110144 | A1 | 4/2017 | Sharifi et al. | |
| 2017/0132019 | A1 | 5/2017 | Karashchuk et al. | |
| 2017/0358301 | A1 | 12/2017 | Raitio et al. | |
| 2018/0307761 | A1* | 10/2018 | Felt | G06F 16/685 |

OTHER PUBLICATIONS

Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Buckland et al., "Amazon's Alexa Takes Open-Source Route to Beat Google Into Cars", Bloomberg, Feb. 27, 2018, 6 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
International Search Report and Written Opinion for PCT Appl. Ser. No. PCT/US2017/037284 dated Feb. 26, 2018, 11 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
"Walmart and Google to offer voice-enabled shopping", BBC News, Aug. 23, 2017 (3 pages).
Amazon, "Echo Look | Hands-Free Camera and Style Assistant" reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Broussard, Mitchel, "Chatbot-Like Siri Patent Includes Intelligent Image, Video, and Audio Recognition within Messages", MacRumors, May 11, 2017 (7 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Forrest, Conner, "Essential Home wants to be 'bridge' between Amazon Alex, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own 'Echo Dot'", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Larson, Selena, "Google Home now recognizes your individual voice", CNN Money, San Francisco, California, Apr. 20, 2017 (3 pages).
Lee, Dave, "The five big announcements from Google I/O", BBC News, May 18, 2017 (9 pages).

(56) References Cited

OTHER PUBLICATIONS

Nieva, Richard, "Google Home and eBay can tell you how much that's worth", cnet, Mar. 8, 2017 (3 pages).
Patently Apple, "Today Google Home's Virtual Assistant can learn its Owner's voice for Security Reasons like Apple's Patent Pending Idea", Apr. 20, 2017, reprinted from http://www.patentlyapple.com/patently-apple/2017/04/today-google-homes-virtual-assistant-can-learn-its-owners-voice-for-security-reasons-like-apples-patent-pending-idea.html on Aug. 22, 2017 (4 pages).
Patently Apple, "Apple Patent Reveals a New Security Feature Coming to Siri" Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, Sarah, "The first ad network for Alexa Skills shuts down following Amazon's policy changes Tech Crunch", Jun. 15, 2017 (6 pages).
Porter, Jon, "Amazon Echo Show release date, price, news and features", Techradar, Jun. 26, 2017 (14 pages).
Sablich, Justin, "Planning a Trip With the Help of Google Home", New York Times, May 31, 2017 (6 pages).
Sherr, Ian, "IBM built a voice assistant for cybersecurity", cnet, Feb. 13, 2017 (2 pages).
Siefert, Dan, "Samsung's new virtual assistant will make using your phone easier", The Verge, Mar. 20, 2017 (6 pages).
Siegal, Daniel, "IP Attys' Load Up Apps Legal Challenges at 'Silicon Beach'", Law360, Los Angeles, California, Feb. 2, 2017 (4 pages).
Smith, Dave, "The Amazon Echo got 2 incredibly useful features thanks to a new update", Business Insider, Jun. 1, 2017 (5 pages).
Willens, Max, "For publishers, Amazon Alexa holds promise but not much money (yet)", Digiday, Jul. 6, 2017 (6 pages).

\* cited by examiner

ESTABLISHMENT OF AUDIO-BASED NETWORK SESSIONS WITH NON-REGISTERED RESOURCES

CROSS-REFERENCE TO RELATED APPLICATIONS

The present application is a U.S. National Stage filing under 37 USC § 371 of P.C.T. Application No. PCT/US2017/037284, filed Jun. 13, 2017, and claims the benefit of priority thereto. The foregoing application is hereby incorporated by reference in its entirety.

BACKGROUND

A computer system can interact with network resources that are configured to interact with the computer system. To interact with the network resource an interface can be designed for each network resource. The expansion of certain computer systems can be limited because customized interfaces for each of the network resources cannot be efficiently created, and can be duplicative and wasteful of computing resources such as bandwidth, time, or electrical power. Accordingly, the expansion of certain computer systems is not scalable using current onboarding techniques for network resources.

SUMMARY

At least one aspect is directed to a system to retrieve digital components in a voice activated data packet based computer network environment includes a natural language processor component. The natural language processor component can be executed by a data processing system. The natural language processing component can receive, via an interface of the data processing system, data packets that can include an input audio signal detected by a sensor of a computing device. The natural language processor component can parse the input audio signal to identify a request, a content provider, and a trigger keyword corresponding to the request. The system can include a direct action application programming interface that can generate, based on the trigger keyword, an action data structure. The action data structure can be generated responsive to the request and the identified content provider. The system can include a navigation component. The navigation component can establish a session with the identified content provider. The navigation component can render a digital component received, via the session, from the content provider. The navigation component can select an interaction model associated with the content provider. The navigation component can generate a data array based on the interaction model and the action data structure. The system can transmit, via the interface of the data processing system, the data array to the remote data processing system.

At least one aspect is directed to a method to retrieve and interact with digital components in a voice activated data packet based computer network environment. The method can include receiving, by a natural language processor component executed by a data processing system and via an interface of the data processing system, data packets that can include an input audio signal detected by a sensor of a computing device. The method can include parsing, by the natural language processor component, the input audio signal to identify a request, a content provider, and a trigger keyword corresponding to the request. The method can include generating, by a direct action application programming interface, based on the trigger keyword, an action data structure. The action data structure can be generated responsive to the request and the content provider. The method can include establishing, by a navigation component, a session with the content provider. The method can include rendering, by the navigation component, a digital component received, via the session, from the remote data processing system. The method can include selecting, by the navigation component, an interaction model associated with the remote data processing system. The method can include generating, by the navigation component, a data array based on the interaction model and the action data structure. The method can include transmitting, by the data processing system and via the interface of the data processing system, the data array to the remote data processing system.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
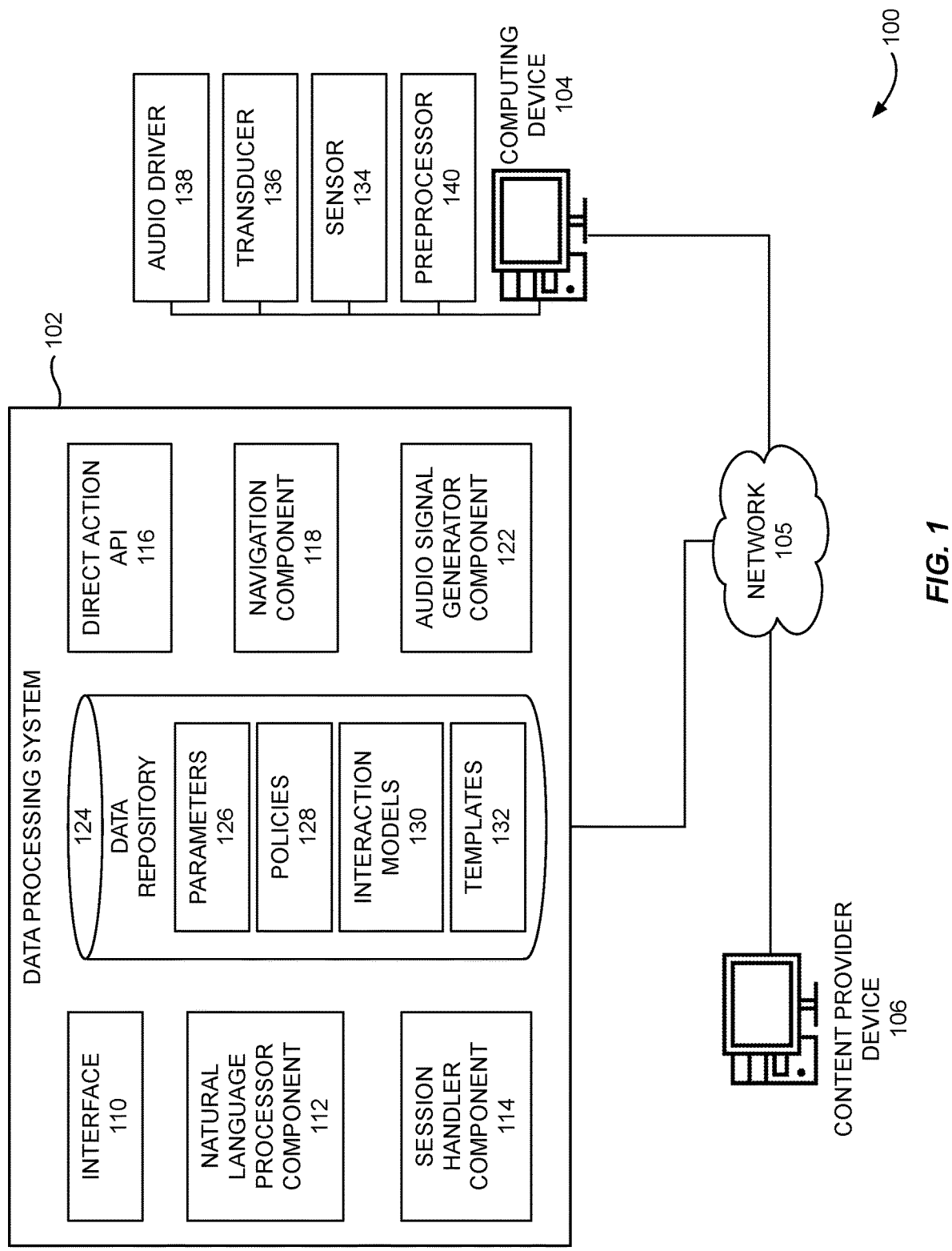
FIG. 1 illustrates a block diagram of an example system to select and interact with digital via a computer network.

Following below are more detailed descriptions of various concepts related to, and implementations of, methods, apparatuses, and systems of retrieving and interacting digital components in an audio-based computer network. The various concepts introduced above and discussed in greater detail below may be implemented in any of numerous ways, as the described concepts are not limited to any particular manner of implementation The present disclosure is generally directed systems and methods that increase the scalability of onboarding network resources, such as a digital component, to a voice or image based network. The system can include a data processing system that enables the navigating of and interaction with digital components, such as a webpage, portion thereof, or other online document using voice, image, or speech input and output interfaces on computing device. The system can receive and processes a speech input (also referred to herein as an input audio signal) to identify a digital component. The system can identify a content provider that provides the digital component. The voice input (or other non-text input such as an image input) can include verbal instructions associated with at least one resource of a defined type that can be accessed in the digital component. The resource can be, include, or correspond to an action to complete via the identified digital component or a specific item or webpage contained in or otherwise identified by the digital component. The system can create a session with the content provider hosting the digital component. The system can render the digital component received from the content provider. The system can headlessly render the digital component without a user interface. The system can analyze, using an interaction model, the rendered digital component to navigate to the resource using the interaction model. The system can select the interaction model from a first model type and a second model type. The first model type can be or include a generic model that can incorporate a first training data set that is based on a collection of websites having resources of the same type as the resource identified in the speech input. The second model type can be or include a specific model that incorporates a second training data set specific to resources of the digital component. Both of the model sets can include data for determining access to respective resources or navigating the digital component. The system can provide information related to the associated resources to the computing device for one or more subsequent operations based on the received instructions to access the respective resource. The system can also update the interaction models based on one or more determinations made when navigating the digital component to access the resource or additional resources.

The system can input data into the digital component. The data can be provided by a user and stored in a secure storage wallet on the computing device or system. The data can be provided to the system automatically during the creation of the session with the digital component or when required during the created session for one or more subsequent operations.

The system can generate the generic models by obtaining and storing information regarding one or more of terminology, layout, categories and hyperlinks that are common to accessing a respective type of resource on a plurality of different digital components. The system can generate the specific model by obtaining and storing information regarding one or more of terminology, layout, menus, categories, and hyperlinks of resources respective to the digital component identified in the speech input.

Onboarding of network resources into a voice-activated network such that other network resources can interact with the network resources can be technologically difficult because a unique interface may need to be created for each resource. For example, the owners of the resource may need to create an application program interface (API) that enables the provider of the voice-based computing device to interact with the resource. The provider of the voice-based computing device may also need to generate a program that enables the computing device to interact with the resource via the provided API. The provider of the voice-based computing device can provide the API, which the resource owner can incorporate into their digital component. This onboarding process can be time consuming, computationally inefficient and may require the cooperation of the two parties.

The onboarding process may be required to conduct a transaction with the resource, to gain access to a secure part of the resource, or exchange sensitive information. Techniques for interacting with these resources with a voice-input interface to conduct transactions and exchange data may require tight integration of the resource interface of the voice-based computing device so that a computing device can navigate through a resource using a speech command issued to the particular user interface module. Such resource specific integration that may need to be predefined between the interface module and the respective resource can be necessary to ensure that the user of the computing device is provide with a secure, fast, and seamless experience. This is because prior security configuration of how secure data is obtainable to the interface module (e.g., from a secure wallet on the computing device), as well as prior integration with the particular resource may be required so that the interface module knows the layout of the resource inputs, components, or other interaction objects.

Accordingly, interfacing with resources that have not gone through the onboarding process to establish a tight integration between the voice-based computing device and the resource may not be possible. The completion of actions with a resource using the voice-based computing device may not be possible without an integration with each and every resource.

Furthermore, the voice (or image or video) based computing device can use a number of speech recognition based interface modules. Depending on the module that a particular interface module uses, a pre-defined integration with each respective interface module may be required for each resource that the voice-based computing device could interact with.

Techniques that provide such integrations with voice-based computing device to enable navigation and interaction with a resource can suffer from the above explained drawbacks of requiring very specific and close pre-defined integration for each resource. These techniques may not be scalable and cannot be applied to all resources. For example, a website or a domain that offer the functionality to allow a speech controlled user interface module to navigate the website, may need to limit the functionality to one type of interface module rather than being able to interact with any voice input recognition module.

Accordingly, there exists a need for provision of a generic and scalable technique enabling voice-based computing devices to navigate and interact with all resources using a speech, voice, or image input recognition interface module.

The present disclosure provides the following technical steps for enabling a real time and scalable technique operable with all resources that provide products, services, or other actions. A user can initiate a command via a voice-based computing device, such as "OK, I want to obtain product X on website Y, please let me know the price and availability." The system (e.g., a data processing system) can use natural language processing to parse and interpret the input audio signal. For example, the system can obtain a user's credentials for website Y via a secure wallet. The system can initiate a session with website Y. The server can headlessly render website Y. The system can then navigate website Y using one of a specific or generic interaction model to obtain the price and availability to product X. The price and availability can be provided to the user's computing device via an output audio file that is presented to the user via a transducer (e.g., speaker) on or associated with the computing device. The user can confirm the purchase or provide additional details to the system via a second input audio signal that the system can parse. In this example, the system enabled the user to interact with website Y without requiring any specific integration between the system and the voice-based computing device. The technique provides a method and system that can in real time interact with a website, network resource, or other digital component using trained interaction models and without the specific integration.

The techniques described herein can be generic and scalable to all types of digital component and can enable the interaction of the data processing system with the digital components without pre-integration or coordination between the digital component provider and the provider of the voice-based computing device.

The above technical solution is provided by the technical features of a server side headless rendering of respective digital components to establish a mapping between the server and the domain of the website. Using as least one trained interaction model the system can identify the structure, elements, input elements, and other components of the digital component. The above steps can occur seamlessly and automatically in real time to further provide an effective end user experience of processing the input audio signal to interact with a digital component.

FIG. 1 illustrates a block diagram of an example system 100 to select and interact with digital components via a computer network. The system 100 can include content selection infrastructure. The system 100 can include a data processing system 102. The data processing system 102 can communicate with one or more of a content provider computing device 106 or client computing devices 104 via a network 105. The network 105 can include computer networks such as the Internet, local, wide, metro, or other area networks, intranets, satellite networks, and other communication networks such as voice or data mobile telephone networks and combinations thereof. The network 105 can access information resources such as web pages, web sites, domain names, or uniform resource locators that can be presented, output, rendered, or displayed on at least one computing device 104, such as a laptop, desktop, tablet, personal digital assistant, smart phone, home assistant device, portable computer(s), or speaker. For example, via the network 105 a user of the computing device 104 can access information or data provided by the content provider device 106.

The data processing system 102 can include an interface 110, a natural language processor component 112, and a session handler component 114. The data processing system 102 can also include a direction action application programming interface 116, a navigation component 118, and an audio signal generator component 122. The data processing system 102 can also include a data repository 124 on which parameters 126, policies 128, interaction models 130, and templates 132 are stored.

The network 105 can be used by the data processing system 102 to access information resources such as web pages, web sites, domain names, or uniform resource locators that can be presented, output, rendered, or displayed by the client computing device 104. The web pages, web sites, and the other digital content stored or otherwise provided by the content provider device 106 can be referred to as digital components or content items. Via the network 105 a user of the client computing device 104 can access information or data (e.g., digital components such as content items) provided by the content provider computing device 106.

The digital component can be rendered via a display device of the computing device 104 or can be rendered on the data processing system 102. Rendering can include displaying the digital component or other content item on a display device that may or may not be part of the computing device 104. In some implementations, the computing device 104 does not include a display device for rendering the digital component. For example, the computing device 104 can only render digital components by playing the digital component via a speaker of the computing device 104. The data processing system 102 can act as an intermediary and enable the computing device 104 to interact with the digital component in an audio based fashion.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104 or the content provider device 106 (content provider 106). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one content provider device 106. The content provider device 106 can include at least one logic device such as a computing device having a processor to communicate via the network 105. The content provider device 106 can include at least one computation resource, server, processor or memory. For example, the content provider device 106 can include a plurality of computation resources or servers located in at least one data center.

The content provider computing device 106 can provide digital components to the data processing system 102 and the computing device 104. The digital components can be webpages that include graphics, text, hyperlinks, and machine executable instructions. The digital components can be displayed visually to an end user, such as, via a web browser rendering the webpage and displaying the rendered webpage to the user on a display. The digital component can be or include a webpage including an offer, good, service, or information. For example, the digital component can be a website that sales clothing.

The computing device 104 can include, interface, or otherwise communicate with at least one sensor 134, transducer 136, audio driver 138, or pre-processor 140. The sensor 134 can include, for example, an ambient light sensor, proximity sensor, temperature sensor, accelerometer, gyroscope, motion detector, GPS sensor, location sensor, microphone, or touch sensor. The transducer 136 can include a speaker or a microphone. The audio driver 138 can provide a software interface to the hardware transducer 136. The audio driver 138 can execute an audio file or other instructions provided by the data processing system 102 to control the transducer 136 to generate a corresponding acoustic wave or sound wave. The pre-processor 140 can be configured to detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets (or other protocol based transmission) carrying some or all of the input audio signal responsive to detecting an instruction to perform such transmission, such as "OK," "start," or another wake word. The instruction can include, for example, a trigger keyword or other keyword or approval to transmit data packets comprising the input audio signal to the data processing system 102. In some cases, the primary user interface of the computing device 104 may be a microphone and speaker.

Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The client computing device 104 can be associated with an end user that enters voice queries as audio input into the client computing device 104 (via the sensor 134) and receives audio output in the form of a computer generated voice that can be provided from the data processing system 102 (or the content provider computing device 106) to the client computing device 104, output from the transducer 136 (e.g., a speaker). The computer generated voice can include recordings from a real person or computer generated language. Rather than voice queries, the input can also include one or more images or video segments generated or obtained (e.g., via the network 105) from the client computing device 104 and parsed by the data processing system 102 to obtain the same type of information obtained by parsing of the voice queries. For example, the user can take a picture of item they wish to purchase. The data processing system 102 can perform machine vision on the image to identify the contents of the image and generate a text string that identifies the contents of the image. The text string can be used as the input query.

The data processing system 102 can include, interface, or otherwise communicate with at least one interface 110 that enables the data processing system 102 to communicate with other devices, such as via the network 105. The data processing system 102 can include, interface, or otherwise communicate with at least one natural language processor component 112. The data processing system 102 can include, interface, or otherwise communicate with at least one direct action application programming interface ("API") 116. The data processing system 102 can include, interface, or otherwise communicate with at least one session handler 114. The data processing system 102 can include, interface, or otherwise communicate with at least navigation component 118. The data processing system 102 can include, interface, or otherwise communicate with at least one audio signal generator 122. The data processing system 102 can include, interface, or otherwise communicate with at least one data repository 124.

The data processing system 102 can include, interface, or otherwise communicate with a navigation component 118. The navigation component 118 can enable a voice-based interaction between a computing device 104 and a digital component, such as a website, provided by a content provider 106. The digital component provided by the content provider 106 may not be configured to accommodate a voice-based interaction. For example, the digital component can be a webpage that includes text, images, video, input elements, and other non-audio elements. Additionally, there may be no previously established integration between the digital component (or provider thereof) and the data processing system 102. The navigation component 118 can render the digital component, using for example, a headless browser or headless webkit renderer, and identify input elements, text, and other data in the digital component. When rendered with a headless renderer, the rendered digital component does not require a graphical user interface to function. The navigation component 118 can interact with those elements using an interaction model. For example, the navigation component 118 can input data arrays into the input fields, select and activate input elements (e.g., navigation or submission buttons), and retrieve data based on the interaction model to complete an action as identified in an input audio signal received from the computing device 104. As one example, for the input audio signal "buy two shirts," the navigation component 118 can generate a data array of "text=2." The navigation component 118 can also identify the input field and the "buy" button in the headlessly rendered webpage. The navigation component 118 can enter the text "2" into the input field and then select the "buy" button to complete the transaction.

The data repository 124 can include one or more local or distributed databases, and can include a database management system. The data repository 124 can include computer data storage or memory and can store one or more parameters 126, one or more policies 128, interaction models 130, and templates 132 among other data. The parameters 126, policies 128, and templates 132 can include information such as rules about a voice based session between the client computing device 104 and the data processing system 102. The data repository 124 can also store content data that can include content items for audio output or associated metadata, as well as input audio messages that can be part of one or more communication sessions with the client computing device 104. The parameters 126 can include, for example, thresholds, distances, time intervals, durations, scores, or weights.

The interaction models 130 can be generated and updated by the navigation component 118. The data repository 124 can include multiple interaction models. The interaction models 130 can be categorized into generic models and content provider specific models. The generic models can be further subdivided into different interaction or action categories. For example, the interaction models 130 can include a generic model for different types of commercial website, such as a shopping website, a weather provider website, and a reservation booking website.

The interaction models 130 can also include specific models. The specific interaction models can be specific to a content provider 106 or a specific digital component provided by a specific content provider 106. For example, for a specific website Y, the specific interaction model can know the placement of links, menus, how to navigate the website, and how particular products and data is stored and classified within the website. The navigation component 118 can use this information to navigate through the website and to provide data arrays to the website when interacting with the website to complete an action or other transaction with the website.

The generic interaction models can be used when the navigation component 118 has not had a predetermined number of interactions with the digital component or content provider 106 to generate a specific interaction model. The navigation component 118 can train the models (both the generic and the specific interaction models), by initially collecting data from specific sessions (e.g., user sessions upon obtaining their permission or specific training sessions where a user interacts with the digital component). For example, given an input audio signal, a user can complete the task of the input audio signal (e.g., "Ok, buy a shirt.") The navigation component 118 can receive the inputs made by the user in completing the action and build a model that enables the navigation component 118 to identify the input elements, such as text fields and buttons, that are used in completing the action. The specific models can be trained on specific digital components and the generic models can be trained using a plurality of digital component within a given category. The training can enable the model to determine interaction data such as the steps involved in purchasing a particular product, categories of products, sorting of products, and how ordering is carried out on the digital component. The models can enable the navigation component 118 to correctly identify and interact with the products or services that are identified in the input audio signal.

Both types of interaction models 130 can be trained and updated during and after sessions between the data processing system 102 and the content provider 106. For example, while using a generic model for a digital component, the navigation component 118 can build a specific model for the digital component. Once the specific interaction model for the specific navigation component 118 is deemed to be reliable, for example by being built with the data from a predetermined number of sessions, the navigation component 118 can begin to use the specific interaction model for the digital component rather than the generic model. The navigation component 118 can use the data from additional (or new sessions) to updated the interaction models 130.

The interface 110, the natural language processor component 112, the session handler 114, the direct action API 116, the navigation component 118, or the audio signal generator component 122 can each include at least one processing unit or other logic device such as programmable logic array engine, or module configured to communicate with the database repository or database 124. The interface 110, the natural language processor component 112, the session handler 114, the direct action API 116, the navigation component 118, the audio signal generator component 122, and the data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous and the computing device 104 can be associated with a unique identifier (e.g., a unique identifier for the user or the computing device 104 provided by the data processing system 102 or a user of the computing device). The data processing system 102 can associate each observation with a corresponding unique identifier.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can receive data packets or other signal that includes or identifies an audio input signal. For example, the data processing system 102 can execute or run the NLP component 112 to receive or obtain the audio signal and parse the audio signal. For example, the NLP component 112 can provide for interactions between a human and a computer. The NLP component 112 can be configured with techniques for understanding natural language and allowing the data processing system 102 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 102 can serve.

The audio input signal can be detected by the sensor 134 or transducer 136 (e.g., a microphone) of the client computing device 104. Via the transducer 136, the audio driver 138, or other components the client computing device 104 can provide the audio input signal to the data processing system 102 (e.g., via the network 105) where it can be received (e.g., by the interface 110) and provided to the NLP component 112 or stored in the data repository 124.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 112 can apply a semantic processing technique, or other natural language processing technique, to the data packets comprising the sentence to identify trigger phrases "do my laundry" and "do my dry cleaning". The NLP component 112 can further identify multiple trigger keywords, such as laundry, and dry cleaning. For example, the NLP component 112 can determine that the trigger phrase includes the trigger keyword and a second trigger keyword.

The NLP component 112 can parse the input audio signal to identify, determine, retrieve, or otherwise obtain an identification of a remote content provider 106 or remote data processing system 102 in a method similar to the method the NLP component 112 uses to obtain the request and trigger keyword. For example, the input audio signal including the phrase "ok, buy a red shirt from ABC" can be parsed to identify ABC as a seller of shirts. The data processing system 102 can then determine a content provider 106 associated with ABC. The content provider 106 can be a server that hosts ABC's website. The data processing system 102 can identify a web address of ABC, such as "www.ABC.com." The data processing system 102 can transmit a confirmation audio signal to the computing device 104, such as "Are you referring to ABC of www.ABC.com?" Responsive to receiving a confirmation message from the computing device 104, the data processing system 102 can initiate a session with the content provider 106 located at www.ABC.com.

The NLP component 112 can filter the input audio signal to identify the trigger keyword. For example, the data packets carrying the input audio signal can include "It would be great if I could get someone that could help me go to the airport", in which case the NLP component 112 can filter out one or more terms as follows: "it", "would", "be", "great", "if", "I", "could", "get", "someone", "that", "could", or "help". By filtering out these terms, the NLP component 112 may more accurately and reliably identify the trigger keywords, such as "go to the airport" and determine that this is a request for a taxi or a ride sharing service.

The data processing system 102 can include a direct action API 116 designed and constructed to generate, based on the trigger keyword, an action data structure responsive to the request and the identified remote content provider 106. Processors of the data processing system 102 can invoke the direct action API 116 to execute scripts that generate a data structure to the content provider 106 request or order a service or product, such as a car from a car share service. The direct action API 116 can obtain data from the data repository 124, as well as data received with end user consent from the client computing device 104 to determine location, time, user accounts, logistical or other information to allow the data processing system 102 to perform an operation, such as reserve a car from the car share service.

The direct action API 116 can execute a specified action to satisfy the end user's intention when the data processing system 102 interacts with the digital component from the content provider device 106. Depending on the action specified in its inputs, the direct action API 116 can execute code or a dialog script that identifies the parameters required to fulfill a user request, which can be included into an action data structure. Such code can look-up additional information or it can provide audio output for rendering at the client computing device 104 to ask the end user questions such as the user's preferred shirt size, to continue the above example where the input audio signal is "ok, by a red shirt." The direct action API 116 can determine necessary parameters and can package the information into an action data structure. For example, when the input audio signal is "ok, buy a red shirt," that action data structure can include the user's preferred shirt size.

The direct action API 116, upon identifying the type of request, can access the corresponding template from a template repository stored in the data repository 124. The templates 132 can include fields in a structured data set that can be populated by the direct action API 116 to further the operation of fulfilling or interacting with the digital component provided by the content provider 106. The direct action API 116 can perform a lookup in the template repository to select the template that matches one or more characteristic of the trigger keyword and request. For example, if the request corresponds to a request for a car or ride to a destination, the data processing system 102 can select a car sharing service template. The car sharing service template can include one or more of the following fields: device identifier, pick up location, destination location, number of passengers, or type of service. The direct action API 116 can populate the fields with values. To populate the fields with values, the direct action API 116 can ping, poll or otherwise obtain information from one or more sensors 134 of the computing device 104 or a user interface of the computing device 104. For example, the direct action API 116 can detect the source location using a location sensor, such as a GPS sensor. The direct action API 116 can obtain further information by submitting a survey, prompt, or query to the end of user of the computing device 104. The direct action api 116 can submit the survey, prompt, or query via interface 110 of the data processing system 102 and a user interface of the computing device 104 (e.g., audio interface, voice-based user interface, display, or touch screen). Thus, the direct action API 116 can select a template for the action data structure based on the trigger keyword or the request, populate one or more fields in the template with information detected by one or more sensors 134 or obtained via a user interface, and generate, create or otherwise construct the action data structure to facilitate performance of an operation by the content provider 106.

The data processing system 102 can select the template based from the template data structure based on various factors including, for example, one or more of the trigger keyword, request, type of content provider 106, a category that the content provider 106 (e.g., taxi service, laundry service, flower service, retail service, or food delivery), location, or other sensor information.

To select the template based on the trigger keyword, the data processing system 102 (e.g., via direct action API 116) can perform a look-up or other query operation on the template database using the trigger keyword to identify a template data structure that maps or otherwise corresponds to the trigger keyword. For example, each template in the template database can be associated with one or more trigger keywords to indicate that the template is configured to generate an action data structure responsive to the trigger keyword that the data processing system 102 can process to establish a communication session between the data processing system 102 and the content provider 106.

To construct or generate the action data structure, the data processing system 102 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 102 can identify the values for the fields to populate the fields of the template to create the action data structure. The data processing system 102 can obtain, retrieve, determine or otherwise identify the values for the fields by performing a look-up or other query operation on the data repository 124.

In some cases, the data processing system 102 can determine that the information or values for the fields are absent from the data repository 124. The data processing system 102 can determine that the information or values stored in the data repository 124 are out-of-date, stale, or otherwise not suitable for the purpose of constructing the action data structure responsive to the trigger keyword and request identified by the NLP component 112 (e.g., the location of the client computing device 104 may be the old location and not be the current location; an account can be expired; the destination restaurant may have moved to a new location; physical activity information; or mode of transportation).

If the data processing system 102 determines that it does not currently have access, in memory of the data processing system 102, to the values or information for the field of the template, the data processing system 102 can acquire the values or information. The data processing system 102 can acquire or obtain the information by querying or polling one or more available sensors of the client computing device 104, prompting the end user of the client computing device 104 for the information, or accessing an online web-based resource using an HTTP protocol. For example, the data processing system 102 can determine that it does not have the current location of the client computing device 104, which may be a needed field of the template. The data processing system 102 can query the client computing device 104 for the location information. The data processing system 102 can request the client computing device 104 to provide the location information using one or more location sensors 134, such as a Global Positioning System sensor, WIFI triangulation, cell tower triangulation, Bluetooth beacons, IP address, or other location sensing technique.

In some cases, the data processing system 102 can identify a remote content provider 106 with which to establish a session based on the trigger keyword or request. To identify the content provider 106 based on the trigger keyword, the data processing system 102 can perform a lookup in the data repository 124 to identify a content provider 106 that maps to the trigger keyword. For example, if the trigger keyword includes "ride" or "to go to", then the data processing system 102 (e.g., via direct action API 116) can identify a content provider 106 (or web address thereof) corresponding to Taxi Service Company A. The data processing system 102 can select the template from the template database based on the identified content provider 106. The data processing system 102 can identify the content provider 106 by conducting an internet based search.

The data processing system 102 can include, execute, access, or otherwise communicate with a session handler component 114 to establish a communication session between with the computing device 104 and the data processing system 102. The communication session can also refer to one or more data transmissions between the data processing system 102 and the content provider 106. The communication session between the computing device 104 and the data processing system 102 can include the transmission of the input audio signal that is detected by a sensor 134 of the computing device 104, and the output signal transmitted by the data processing system 102 to the computing device 104. The data processing system 102 (e.g., via the session handler component 114) can establish the communication session responsive to receiving the input audio signal. The data processing system 102 can set a duration for the communication session. The data processing system 102 can set a timer or a counter for the duration set for the communication session. Responsive to expiration of the timer, the data processing system 102 can terminate the communication session. The communication session between the data processing system 102 and the content provider 106 can include the transmission of the digital component from the content provider 106 to the data processing system 102. The communication session between the data processing system 102 and the content provider 106 can also include the transmission of data arrays to the content provider 106. The communication session can refer to a network-based communication session in which data (e.g., digital components, authenticating information, credentials, etc.) is transmitted between the data processing system 102 and the content provider 106 and the data processing system 102 and the computing device 104.

The data processing system 102 can include, execute, or communicate with an audio signal generator component 122 to generate an output signal. The output signal can include one or more portions. The output signal can include content identified from the digital component received from the content provider 106.

The audio signal generator component 122 can generate the output signal with a first portion having sound corresponding to the first data structure. For example, the audio signal generator component 122 can generate the first portion of the output signal based on one or more values populated into the fields of the action data structure by the direct action API 116. In a taxi service example, the values for the fields can include, for example, 123 Main Street for pick-up location, 1234 Main Street for destination location, 2 for number of passengers, and economy for the level of service.

The data processing system 102 (e.g., via interface 110 and network 105) can transmit data packets comprising the output signal generated by the audio signal generator component 122. The output signal can cause the audio driver component 138 of or executed by the computing device 104 to drive a speaker (e.g., transducer 136) of the computing device 104 to generate an acoustic wave corresponding to the output The content provider 106 can provide websites, goods, or services (all generally referred to as digital components) to the computing devices 104 and the data processing system 102. The services and goods can be services and goods that are provided physically (e.g., clothing, car services, other consumables, etc.) and are associated with a digital component. For example, the digital component for a car service can be a website through which the user schedules the car service. The digital component associated with the service or goods can be digital components that are used in the purchase, initiation, setup of the good or services, or other transactions related to the goods and services.

The content provider 106 can include one or more keywords in the digital components. The keywords can be in meta tags, header strings, the body of the digital component, and links. After receiving the digital component, the navigation component 118 can analyze the keywords to categorize the digital component (or content provider 106 associated with the digital component) into different categories. For example, the digital component can be categorized into a news, retail, etc. category that identifies the general subject matter of the digital component. The navigation component 118 can select an interaction model from the interaction models 130 at least partially based on the category of the digital component.

The digital component can be rendered via a display device of the computing device 104 or can be rendered on the data processing system 102. Rendering can include displaying the content item on a display device. In some implementations, the computing device 104 does not include a display device for rendering the digital component. For example, the computing device 104 can only render digital components by playing the digital component via a speaker of the computing device 104. The data processing system 102 can act as an intermediary and enable the computing device 104 to interact with the digital component in an audio based fashion. The computing device 104 can include an application, script or program, installed at the client computing device 104, such as an app to communicate input audio signals to the interface 110 of the data processing system 102. The application can also drive components of the computing device 104 to render output audio signals.

Figure 2:
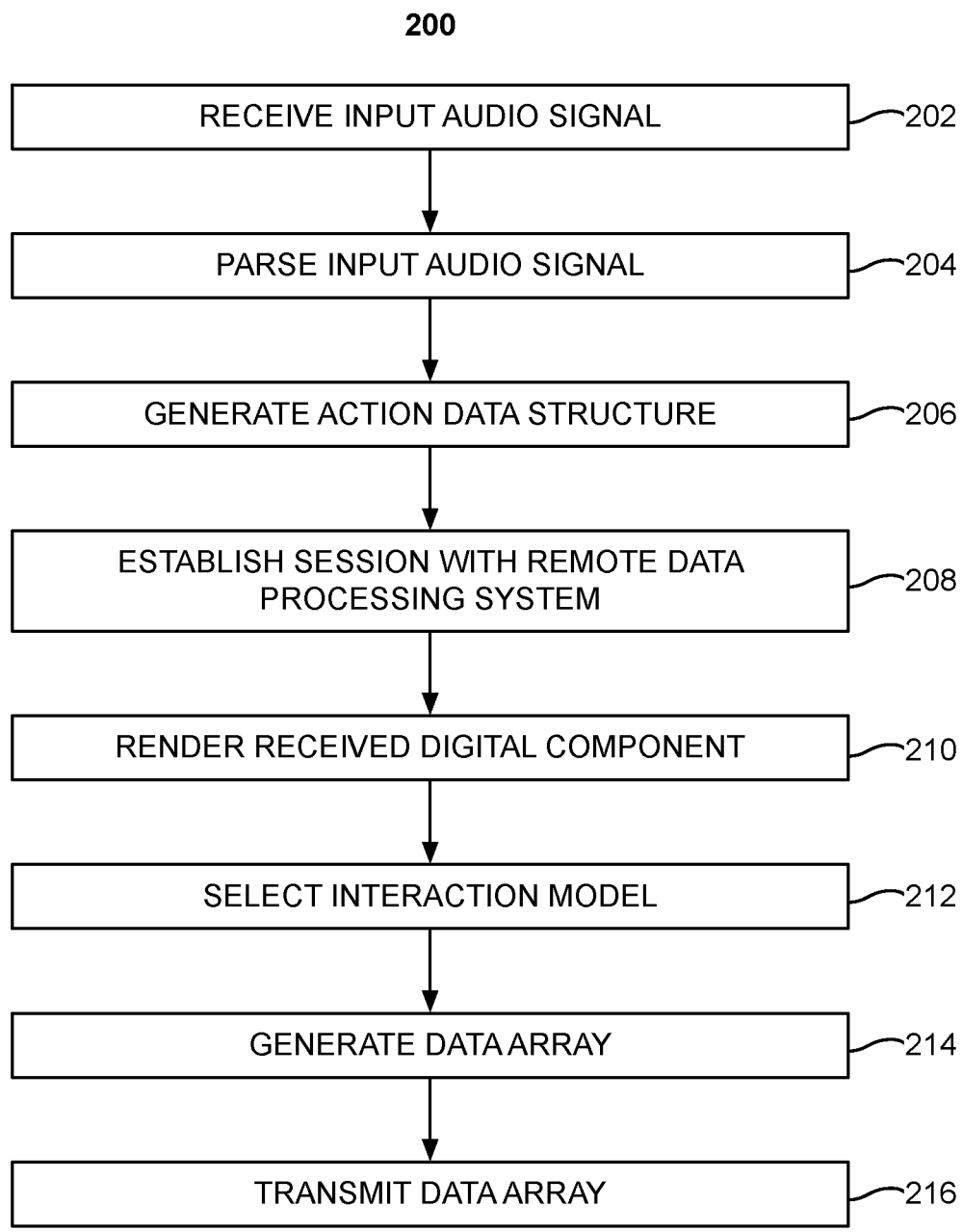
FIG. 2 illustrates a block diagram of an example method to retrieve digital components in the system illustrated in FIG. 1.
Figure 3:
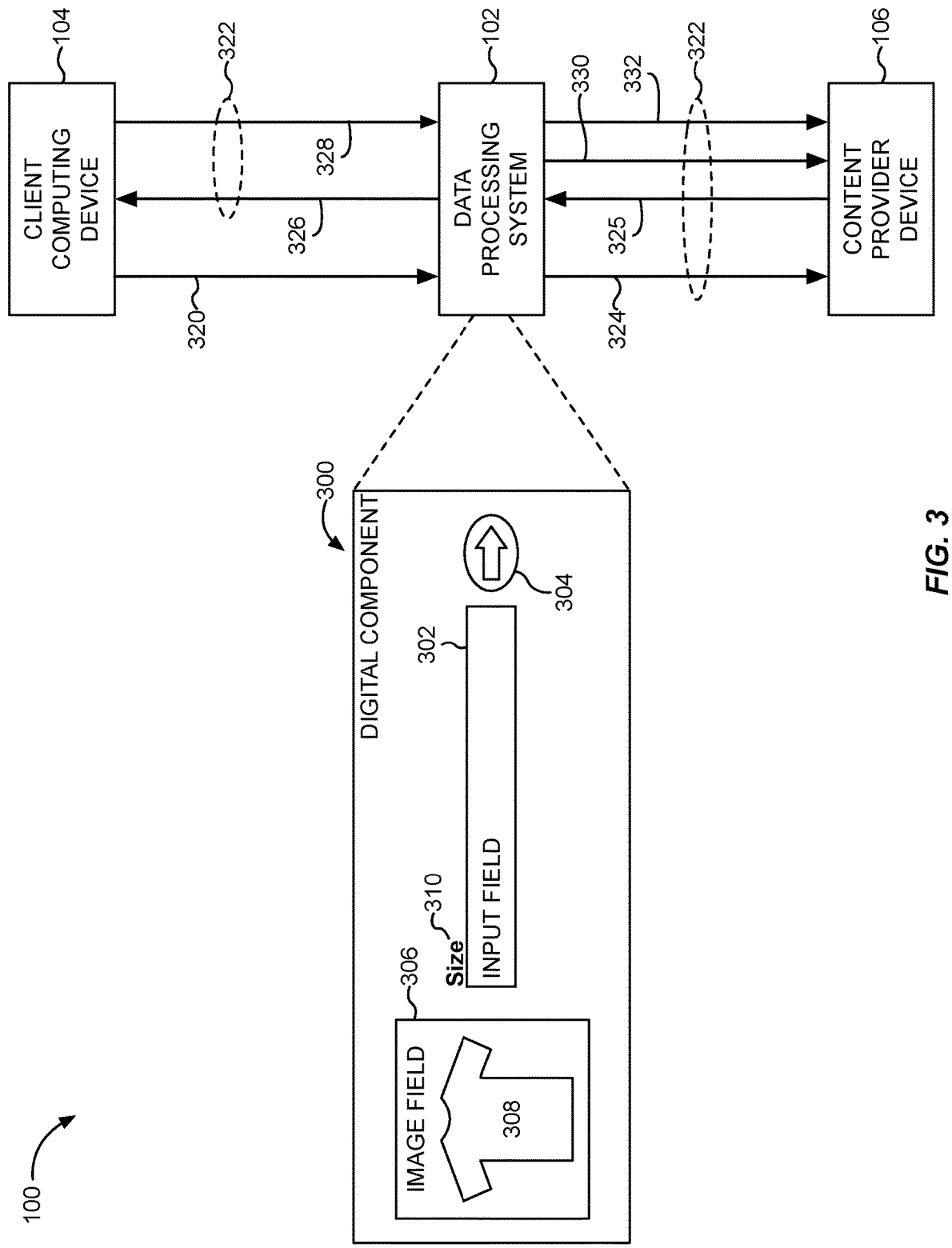
FIG. 3 illustrates a block diagram of an example data flow through the system illustrated in FIG. 1.

FIG. 2 illustrates a block diagram of an example method 200 to retrieve and interact with digital components in a voice activated, data packet (or other protocol) based computer network. FIG. 3 illustrates a block diagram of an example data flow through the system illustrated in FIG. 1 during the course of the method 200 illustrated in FIG. 2. The method 200 includes receiving an input audio signal (ACT 202). The method 200 includes parsing the input audio signal to identify a request, a content provider, and a trigger keyword (ACT 204). The method 200 includes generating an action data structure (ACT 206). The method 200 includes establishing a session with the content provider (ACT 208). The method 200 includes rendering a received digital component (ACT 210). The method 200 includes selecting an interaction model (ACT 212). The method 200 includes generating a data array based on the interaction model (ACT 214). The method 200 includes transmitting the data array to the content provider (ACT 216).

As set forth above, and referring to FIGS. 2-3, the method 200 includes receiving an input audio signal (ACT 202). The data processing system 102 can receive the input audio signal 320 from the computing device 104. The input audio signal 320 can be received by the data processing system 102 via a nlp component 112 over a network. The NLP can be executed by the data processing system 102. The data processing system 102 can receive the input audio signal 320 as data packets that include the input audio signal. The input audio signal can be detected by a sensor, such as a microphone, of the computing device 104.

The method 200 includes parsing the input audio signal to identify a request, a content provider, and a trigger keyword (ACT 204). The input audio signal can be parsed by the natural language processor component 112. For example, the audio signal detected by the computing device 104 can include "Okay device, I want a shirt from ABC Co." In this input audio signal, the initial trigger keyword can include "okay device", which can indicate to the computing device 104 to transmit an input audio signal to the data processing system 102. A pre-processor of the computing device 104 can filter out the terms "okay device" prior to sending the remaining audio signal to the data processing system 102. In some cases, the computing device 104 can filter out additional terms or generate keywords to transmit to the data processing system 102 for further processing.

The data processing system 102 can identify a trigger keyword in the input audio signal 320. The trigger keyword, which can be a phrase, can include, in the above example, "I want a shirt." The trigger keyword can indicate a type of service or product (e.g., the shirt) and an action to take. The data processing system 102 can identify a request in the input audio signal. The request can be determined based on the terms "I want". The trigger keyword and request can be determined using a semantic processing technique or other natural language processing technique. The data processing system 102 can identify the content provider 106 as ABC Co. The data processing system 102 can identify a website, IP address, or other network location of the content provider 106 associated with the content provider 106, ABC Co.

The method 200 includes generating an action data structure (ACT 206). The direct action application programming interface can generate the action data structure based on the trigger keyword. The action data structure can also be generated responsive to the request and the identified content provider 106. The action data structure can be generated from or based on a template. The template can be selected based on the trigger keywords and the identified content provider 106. The generated action data structure can include information and data related to completing the action associated with the trigger keyword. For example, for "I want a shirt from ABC Co." the template may indicate the needed information related to the purchase of shirt can include size, preferred color, preferred style, and preferred price range. The data processing system 102 can populate the fields in the action data structure with values retrieved from the memory or based on responses by the user to output signals transmitted from the data processing system 102 to the computing device 104. The data processing system 102 can populate the secure fields such as user credentials from a secure wallet that can be stored on the data processing system 102 or the computing device 104. The data processing system 102 can request permission from the user to access the secure wallet before obtaining information from the secure wallet.

The method 200 includes establishing a session with the content provider (ACT 208). The data processing system 102 can establish a communication session 322 with the content provider 106 responsive to identifying the content provider 106 in the input audio signal. The communication session 322 can be established to receive a digital component from the content provider 106. The session can be established using the hypertext transfer protocol. The session can be established with a request 324 from the data processing system 102 to the content provider 106. The request 324 can be for a webpage transmitted in the response 325 to the request 324.

The method 200 includes rendering a received digital component (ACT 210). The received digital component can be rendered by the navigation component 118 of the data processing system 102. FIG. 3 illustrates a partial rendering 300 of the digital component. Continuing the above example, the digital component can be received in response to the input audio signal "I want a shirt from ABC Co." The rendered digital component 300 can include input fields 302, buttons 304, menus, image fields 306, images 308, and text 310 (generally referred to as the components or elements of the digital component). Buttons, links, input fields, and radio buttons can generally be referred to as input elements. The digital component can be rendered without a graphical user interface. For example, the digital component 300 can be an HTML document that is rendered by a headless browser. The headless browser of the navigation component 118 can include a layout engine that can render the code of a digital component 300, such as the HTML and JavaScript within the digital component. The navigation component 118, when rendering the digital component in a headless fashion, can render the digital component 300 to an image file that can be analyzed with a machine vision component of the navigation component 118.

The method 200 includes selecting an interaction model (ACT 212). The navigation component 118 can select an interaction model that is associated with the content provider 106. The navigation component 118 can select between two general types of interaction models. The first model can be a generic model that may be the same for each content provider 106 associated with a particular category. For example, the data processing system 102 may include a generic model for shopping websites; a generic model for insurance websites; a generic model for hotel booking websites; and a generic model for food delivery websites. The second type of model can be specific to the content provider 106 (or the digital component received from the content provider 106).

In addition, a second model that is a specific data model may also be used. For example, the model can be specific to ABC Co. Specific or special features such as placement of links to access products, specific menus and how to navigate through them, how particular products are stored and classified within a website may be information that is include in the specific model. The navigation component 118 can use the model to interpret the digital component 300. The navigation component 118 can generate the specific interaction model after a predetermined number of sessions are established between the data processing system 102 and the content provider 106. For example, initially the data processing system 102 can use a generic model when interacting with a given content provider 106. Data from the interactions can be used to build the specific interaction model. Once the data processing system 102 has initiated a predetermined number of sessions and added the session data to the specific model for the content provider 106, the data processing system 102 can begin using the specific interaction model for the content provider 106. While the number of previously established sessions is below the predetermined number, the data processing system 102 can continue to use the generic interaction model when interacting with the content provider 106.

Using the selected model, the navigation component 118 can identify the input fields 302, buttons 304, menus, image fields 306, images 308, and text 310 of the digital component 300 by performing a machine vision analysis of the saved image file of the digital component 300. The navigation component 118 can also identify the components of the digital component 300 by parsing the code of the digital component 300. For example, navigation component 118 can identify HTML tags within the digital component 300. As one example, the navigation component 118 can search for the HTML tags <input> or <form> to identify the input field 302.

When the navigation component 118 identifies an image or button, the navigation component 118 can perform machine vision analysis on the image or button to determine one or more characteristics of the image or button. The characteristics can include a determination of colors within the image (e.g., that the shirt illustrated in image 308 is a red shirt), identification of objects in the image (e.g., that image 308 illustrates a shirt), or text or icons within the image or button (e.g., that button 304 includes an arrow indicating "next" or if the button 304 included the text "next").

The method 200 includes generating a data array based on the interaction model (ACT 214). The data array can be generated by the navigation component 118 based on information identified in the digital component 300 using the interaction model. The data array can be generated using information from the action data structure. For example, using the interaction model, the navigation component 118 can determine the text 310 states "size" and is associated with the input field 302. The action data structure can include an entry of "medium" in the field "size." The navigation component 118 can include "medium" in the data array and input the data array into the input field 302 to indicate that a shirt of medium size should be selected.

The method 200 includes transmitting the data array to the content provider (ACT 216). The data array 330 can be input into the input field 302. The data array 330 can be transmitted to the content provider 106 responsive to the navigation component 118 selecting another input field, such as the button 304. The data array 330 can be transmitted to the content provider 106 responsive to a HTTP POST or GET method. The data processing system 102 can continue to interact with the digital component to complete the action identified in the input audio signal. For example, in the example illustrated in FIG. 3, the data processing system 102 can repeat ACTs of method 200 to select the shirt, checkout or purchase the shirt, and then send a confirmation to the client computing device 102.

The data processing system 102 can establish a communication session 322 between the data processing system 102 and the computing device 104. The communication session 322 can be established by a conversational application programming interface. The communication session 322 can be a real-time, back-and-forth voice or audio based conversation session. The data processing system 102 can establish the communication session 322 with the computing device 104 to retrieve additional information for the action data structure or the data array. For example, the data processing system 102 can transmit an output audio signal 326 with instructions that cause the transducer of the computing device 104 to generate a sound wave of "What is your preferred color." The user can provide a second input audio signal 328 in response to the output audio signal 326. The natural language processor component 112 can process the second input audio signal 328 to identify the user's response, which in this example can be "red." The navigation component 118 can generate a second data array 332 based on the interaction model and the response identified in the second input audio signal 328. The second data array 332 can be transmitted to the content provider 106.

The data processing system 102 can establish a communication session with a second computing device 104 that is associated with the user of the first computing device 104 that originally transmitted the input audio signal. For example, the first computing device 104 can be a voice-based digital assistant speaker system and the second computing device 104 can be the user's smart phone. The data processing system 102 can request additional information or confirmation from the user via the second computing device 104. For example, in the example illustrated in FIG. 3, the data processing system 102 can provide two images of selected shirts to the user's smart phone and request that the user select one of the two shirts. Prior to completing a purchase or making a reservation the data processing system 102 can request a verbal confirmation via the first computing device 104 or a confirmation via the second computing device 104 (e.g., the selection of a "buy" button).

Figure 4:
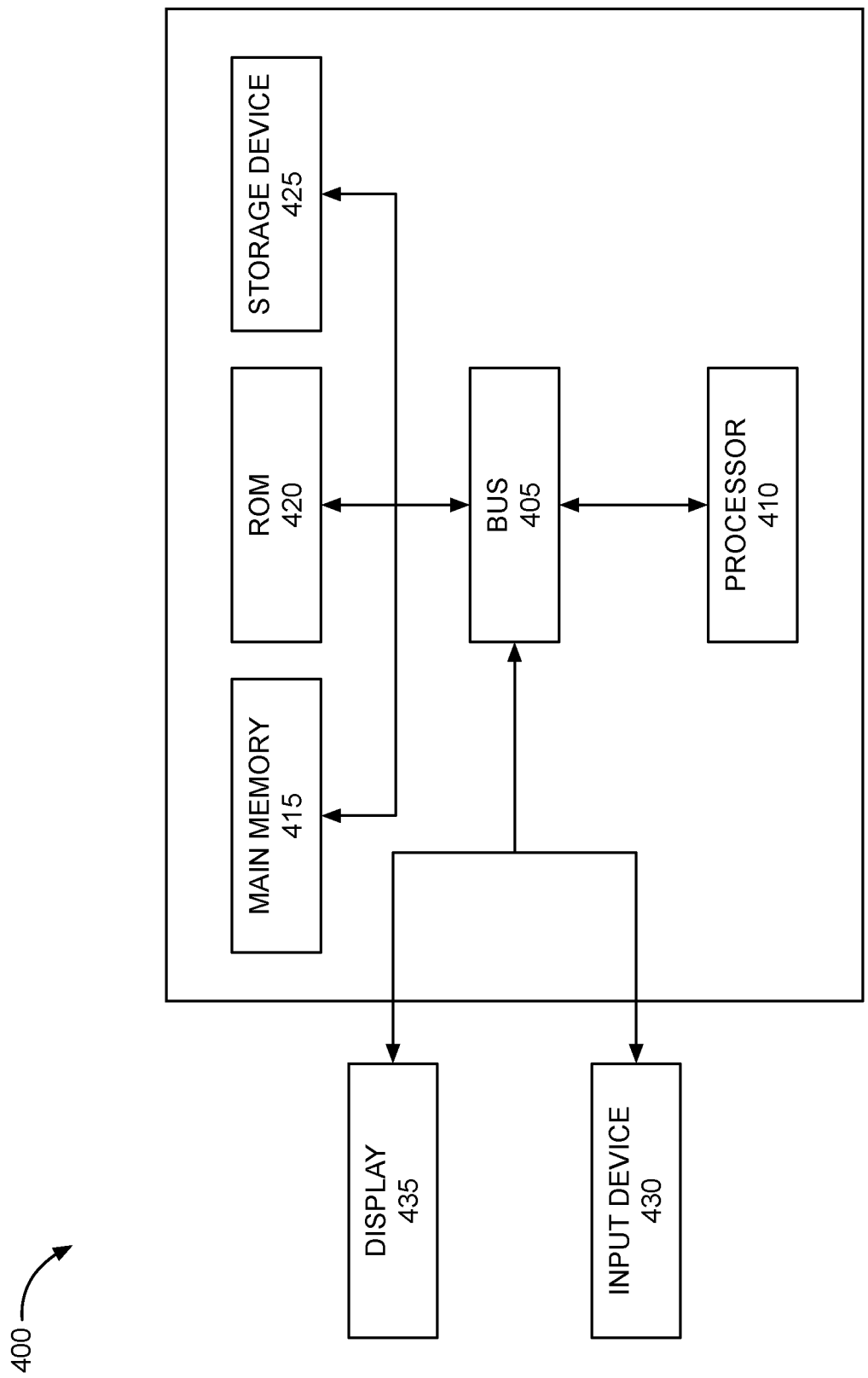
FIG. 4 illustrates a block diagram of an example computer system for use in the system illustrated in FIG. 1.

FIG. 4 is a block diagram of an example computer system 400. The computer system or computing device 400 can include or be used to implement the system 100, or its components such as the data processing system 102. The data processing system 102 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 124. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 124.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 104 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device 104," "component," or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 116, the NLP component 112, and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with the computer system 100 or other elements described herein, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 can include clients and servers. A client and server are generally remote from each other and typically interact through a communication network (e.g., the network 105). The relationship of client and server arises by virtue of computer programs running on the respective computers and having a client-server relationship to each other. A server can transmit data (e.g., data packets representing a content item) to a computing device 104 (e.g., for purposes of displaying data to and receiving user input from a user interacting with the computing device 104). Data generated at the computing device 104 (e.g., a result of the user interaction) can be received from the computing device 104 at the server (e.g., received by the data processing system 102 from the computing device 104 or content provider 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to retrieve digital components in a voice activated data packet based computer network environment, comprising:
    a natural language processor component executed by a data processing system to receive, via an interface of the data processing system, data packets comprising an input audio signal detected by a sensor of a computing device;
    the natural language processor component executed by the data processing system to parse the input audio signal to identify a request, a content provider, and a trigger keyword corresponding to the request;
    a direct action application programming interface executed by the data processing system to generate, based on the trigger keyword, an action data structure responsive to the request and the content provider;
    a navigation component executed by the data processing system to:
        establish, responsive to the identification of the content provider from the input audio signal, a session with the content provider;
        receive a digital component, via the session from the content provider using the request identified from the input audio signal, the digital component comprising one or more input elements for a graphical user interface, the digital component unable to accommodate voice-based interaction with any of the one or more input elements;
        headlessly render an image corresponding to the digital component comprising the one or more input elements received via the session without the graphical user interface for the digital component;
        select an interaction model associated with the content provider to identify the one or more input elements in the rendered image corresponding to the digital component received from the content provider;
        generate, using the interaction model for the one or more input elements of the digital component, a data array to include the action data structure;
        provide the data array as an input to at least one of the one or more input elements of the rendered image corresponding to the digital component; and
    the data processing system to transmit, via the interface, the data array to the content provider to fulfill the request identified from the input audio signal.

2. The system of claim 1, comprising the data processing system to:
    select, from a database stored in memory, a template based on the trigger keyword and the content provider; and
    generate the action data structure based on the template.

3. The system of claim 1, comprising:
    a conversational application programming interface to receive, in a communication session between the data processing system and the computing device established via the interface, data packets comprising a second input audio signal detected by the sensor of the computing device;
    the natural language processor component to parse the second input audio signal to identify a response; and the navigation component to generate a second data array based on the interaction model and the response.

4. The system of claim 1, comprising:
the data processing system configured to provide the data array to an input element of the rendered digital component.

5. The system of claim 1, comprising the data processing system to:
determine a number of previous sessions with the content provider; and
select the interaction model based on the number of previous sessions with the content provider.

6. The system of claim 5, comprising the data processing system to:
select a generic interaction model responsive to the number of previous sessions being less than a predetermined threshold.

7. The system of claim 1, comprising the data processing system to:
identify a characteristic of an image in the rendered digital component.

8. The system of claim 1, comprising the navigation component to:
generate the interaction model based on a previous session with the content provider.

9. The system of claim 1, comprising a conversational application programming interface to:
establish a communication session between the data processing system and the computing device; and
transmit, via the interface, data packets comprising an output audio signal to the computing device.

10. The system of claim 1, wherein the digital component is a webpage.

11. A method to retrieve digital components in a voice activated data packet based computer network environment, comprising:
receiving, by a natural language processor component executed by a data processing system and via an interface of the data processing system, data packets comprising an input audio signal detected by a sensor of a computing device;
parsing, by the natural language processor component, the input audio signal to identify a request, a content provider, and a trigger keyword corresponding to the request;
generating, by a direct action application programming interface, based on the trigger keyword, an action data structure responsive to the request and the content provider;
establishing, by a navigation component, responsive to the identification of the content provider from the input audio signal, a session with the content provider;
receiving, by the navigation component, via the session from the content provider using the request identified from the input audio signal, a digital component comprising one or more input elements for a graphical user interface, the digital component unable to accommodate voice-based interaction with any of the one or more input elements;
headlessly rendering, by the navigation component, an image corresponding to the digital component comprising the one or more input elements without the graphical user interface for the digital component;
selecting, by the navigation component, an interaction model associated with the content provider to identify one or more input elements in the rendered image corresponding to the digital component received from the content provider;
generating, by the navigation component, using the interaction model for the one or more input elements of the digital component, a data array to include the action data structure;
providing, by the navigation component, the data array as an input to at least one of the one or more input element of the rendered image corresponding to the digital component; and
transmitting, by the data processing system and via the interface, the data array to the content provider to fulfill the request identified from the input audio signal.

12. The method of claim 11, comprising:
selecting, from a database stored in memory, a template based on the trigger keyword and the content provider; and
generating the action data structure based on the template.

13. The method of claim 11, comprising:
receiving, by a conversational application programming interface and via a communication session between the data processing system and the computing device, data packets comprising a second input audio signal detected by the sensor of the computing device;
parsing, by the natural language processor component, the second input audio signal to identify a response; and
generating, by the navigation component, a second data array based on the interaction model and the response.

14. The method of claim 11, comprising:
providing the data array to an input element of the digital component.

15. The method of claim 11, comprising:
determining a number of previous sessions with the content provider; and
selecting the interaction model based on the number of previous sessions with the content provider.

16. The method of claim 15, comprising:
selecting a generic interaction model responsive to the number of previous sessions being less than a predetermined threshold.

17. The method of claim 11, comprising:
rendering the digital component without a graphical user interface.

18. The method of claim 11, comprising:
identifying a characteristic of an image in the digital component.

19. The method of claim 11, comprising:
generating the interaction model based on a previous session with the content provider.

* * * * *